(12) United States Patent
McColl

(10) Patent No.: US 11,046,198 B2
(45) Date of Patent: Jun. 29, 2021

(54) METHOD AND SYSTEM FOR MAGNETICALLY LATCHING A CHARGING PORT TO AN ELECTRIC VEHICLE

(71) Applicant: Stuart Frazer McColl, Sequim, WA (US)

(72) Inventor: Stuart Frazer McColl, Sequim, WA (US)

( * ) Notice: Subject to any disclaimer, the term of this patent is extended or adjusted under 35 U.S.C. 154(b) by 0 days.

(21) Appl. No.: 16/818,506

(22) Filed: Mar. 13, 2020

(65) Prior Publication Data

US 2020/0254893 A1    Aug. 13, 2020

Related U.S. Application Data

(63) Continuation of application No. PCT/US2019/016563, filed on Feb. 4, 2019.

(60) Provisional application No. 62/784,956, filed on Dec. 26, 2018, provisional application No. 62/626,203, filed on Feb. 5, 2018.

(51) Int. Cl.
*B60L 9/00* (2019.01)
*B60L 53/16* (2019.01)
*B60L 53/31* (2019.01)
*H01R 13/62* (2006.01)

(52) U.S. Cl.
CPC ............. *B60L 53/16* (2019.02); *B60L 53/31* (2019.02); *H01R 13/6205* (2013.01)

(58) Field of Classification Search
CPC .......... B60L 53/16; B60L 53/31; B60L 53/32; B60L 53/34; B60L 53/30; B60L 53/22; B60L 53/20; B60L 53/18; B60L 53/14; B60L 53/126; B60L 53/10; B60L 53/00; H01R 13/6205; H01R 13/62
USPC .......... 320/103, 104, 107, 108, 109; 191/10; 439/34, 503, 620.21, 620.27
See application file for complete search history.

(56) References Cited

U.S. PATENT DOCUMENTS

| | | | |
|---|---|---|---|
| 5,408,209 A * | 4/1995 | Tanzer ............... | F28D 15/0233 336/60 |
| 5,909,100 A * | 6/1999 | Watanabe ............ | H02J 50/10 320/108 |
| 9,728,867 B2 * | 8/2017 | Allen ................. | H01R 13/6205 |
| 2017/0225583 A1 * | 8/2017 | Chai ................. | B60L 53/36 |
| 2017/0317444 A1 * | 11/2017 | Narayanasamy ..... | H02J 7/0045 |

FOREIGN PATENT DOCUMENTS

DE         102011001034 A1 *   9/2012   ............. B60L 53/16

* cited by examiner

*Primary Examiner* — Anthony M Haughton
(74) *Attorney, Agent, or Firm* — Andrew Morabito

(57) ABSTRACT

A method and apparatus for magnetically latching a charging port to an electric vehicle by first positioning a power receiver connector installed on the electric vehicle near a power source connector. The power source connector that is allowed to move around in three dimensional space, facilitating the alignment of the power source connector with the power receiver connector using a magnetic force. The magnetic forces also use to latch the power source connector to the power receiver connector. At this point, contacts included in the two connectors are engaged in order to provide a temporary conductive charging path.

20 Claims, 13 Drawing Sheets

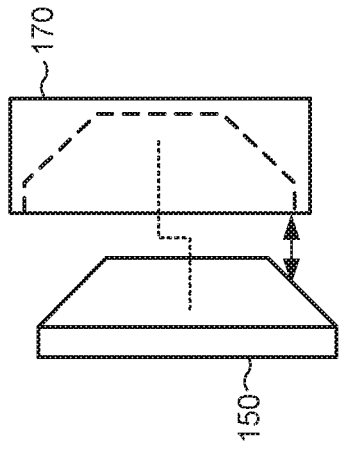
FIG. 8B
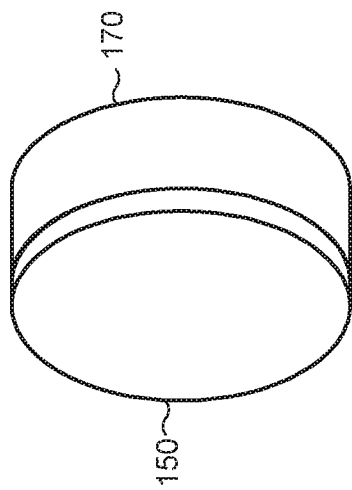
FIG. 8C
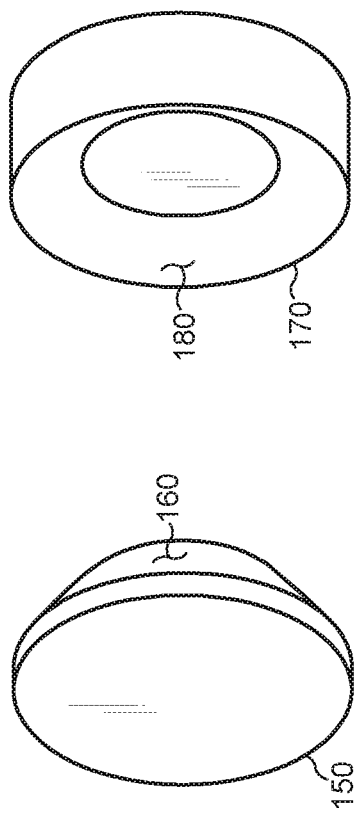
FIG. 8A
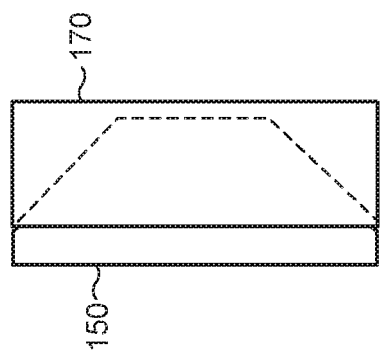
FIG. 8D
FIG. 8E

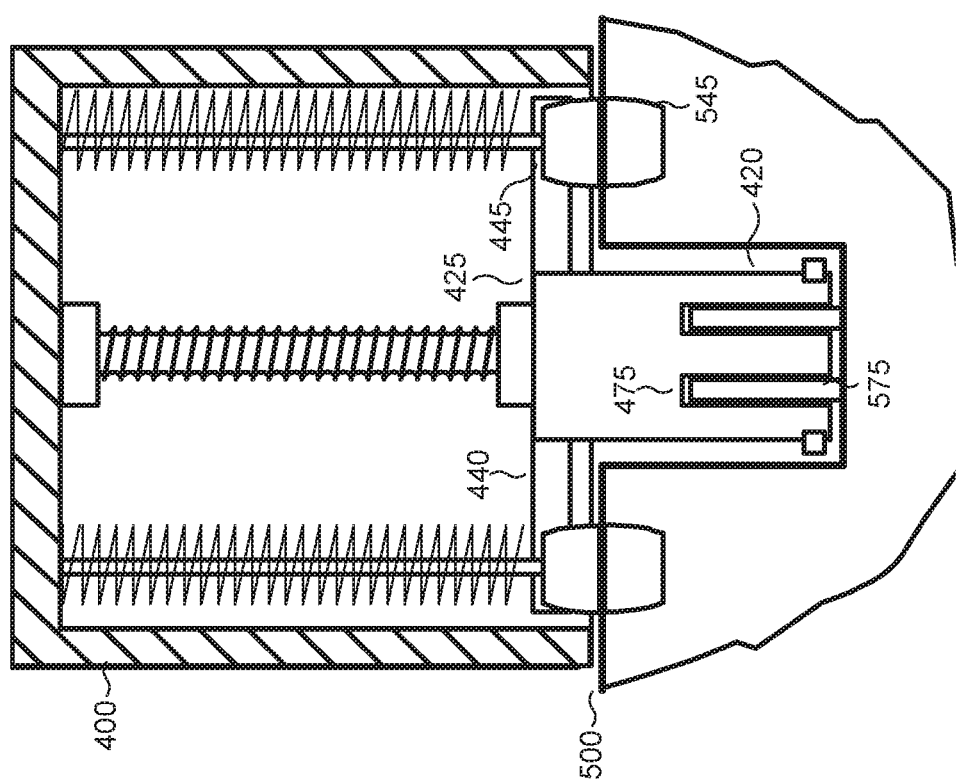

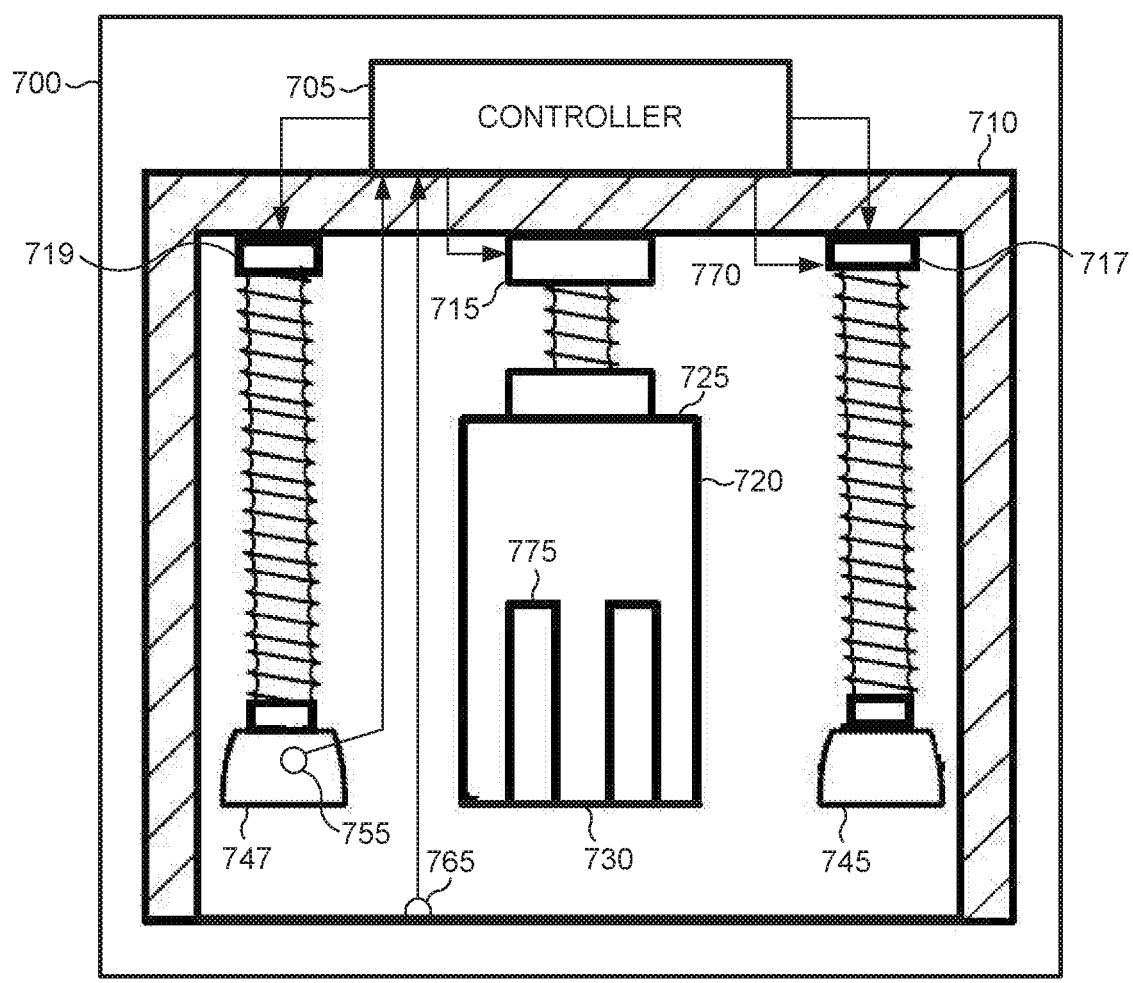
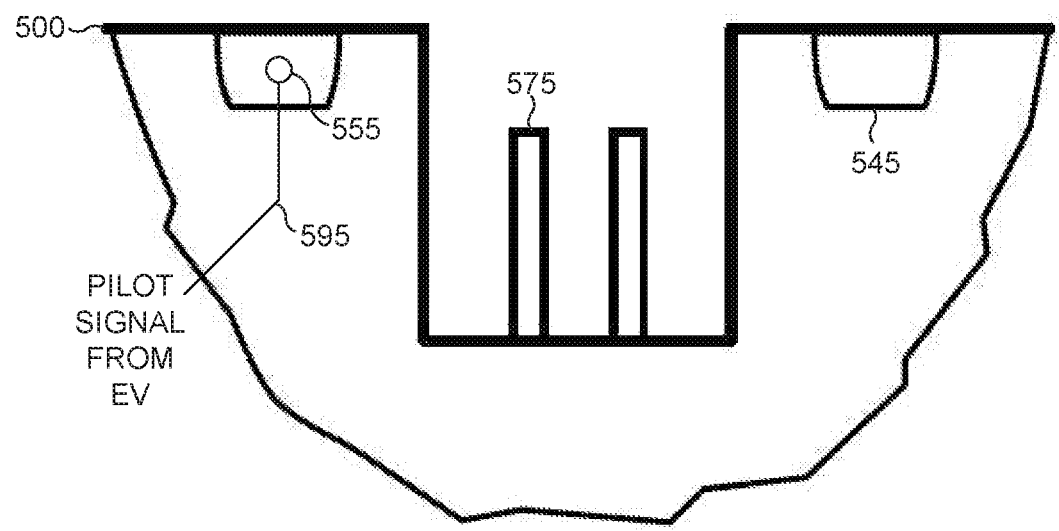
FIG. 15

METHOD AND SYSTEM FOR MAGNETICALLY LATCHING A CHARGING PORT TO AN ELECTRIC VEHICLE

RELATED APPLICATIONS

The present application claims priority to PCT Application Serial Number PCT/US19/16563 entitled "Method And System For Magnetically Latching A Charging Port To An Electric Vehicle" by McColl, which was filed on Feb. 4, 2019; U.S. Provisional Application Ser. No. 62/626,203, entitled "Automatic EV Charging Connection III" by McColl, which was filed on Feb. 5, 2018, the text and drawings of which are incorporated by reference into this application in their entirety; and U.S. Provisional Application Ser. No. 62/784,956, entitled "Automatic Charger Inserter Device" by McColl, which was filed on Dec. 26, 2018, the text and drawings of which are incorporated by reference into this application in their entirety.

BACKGROUND

Supplying power from a charging system to an electric vehicle ("EV"), up until now, has required a cable outfitted with a connector at the cable's end. The connector on the end of the cable interfaces with a connector on the EV. The connector on the cable is referred to as a power source connector and the connector on the EV is referred to as a power receiver connector.

Most people don't yet realize that engaging the power source connector with the power receiver connector is a task that requires significant manual dexterity and application of a substantial force by a human hand. In fact, many would be surprised as to just how much force is needed to affect a conductive power connection using this archaic method.

Not only is this manual process of "plugging in" the EV in to the charging port difficult from a physical standpoint, it is also tedious and time consuming. Just now, as more EVs are hitting the roads, are people realizing just how inconvenient it is to remember to plug in their cars when the get home at the end of the day. It's just plain drudgery.

To further illustrate the problem, many EV vehicle use a power connection system referred to as "SAE J1772". SAE J1772 defines a shrouded 5 pin connector and protocol that requires precise mechanical placement and substantial force to insert. Because of the combination of precision and force required to make the connection, this prior art method is not conducive to simple and efficient automatic connection. Not to entirely disparage the SAE J1772 connection system, the shrouded connector provides a level of safety by protecting the user from high-voltage contact disposed within the shroud.

Because of the difficulty and inconvenience of yesterday's methods, several systems for automatically plugging in an EV have emerged in the marketplace. One curious solution is the "Charging Snake", devised by a frustrated Tesla EV owner. The Charging Snake is an articulating arm that moves in free space much like a striking serpent. But, instead of fangs, the Charging Snake includes a connector that is automatically guided to, and engages with the power receiver connector situated on an electric vehicle. All of the sensors, actuators and intelligence necessary to accomplish this task make up for high cost and low reliability.

BRIEF DESCRIPTION OF THE DRAWINGS

Several alternative embodiments will hereinafter be described in conjunction with the appended drawings and figures, wherein like numerals denote like elements, and in which:

FIG. 8A through 8E are pictorial diagrams that illustrate various example embodiments of a magnetic alignment feature;

FIG. 13 is a pictorial diagram that illustrates a "charge position" state of a power source connector that uses a single actuator;

FIG. 15 is a pictorial diagram that illustrates one alternative example embodiment of a power source connector that utilizes two or more actuators;

DETAILED DESCRIPTION

In the interest of clarity, several example alternative methods are described in plain language. Such plain language descriptions of the various steps included in a particular method allow for easier comprehension and a more fluid description of a claimed method and its application. Accordingly, specific method steps are identified by the term "step" followed by a numeric reference to a flow diagram presented in the figures, e.g. (step 5). All such method "steps" are intended to be included in an open-ended enumeration of steps included in a particular claimed method. For example, the phrase "according to this example method, the item is processed using A" is to be given the meaning of "the present method includes step A, which is used to process the item". All variations of such natural language descriptions of method steps are to be afforded this same open-ended enumeration of a step included in a particular claimed method.

Unless specifically taught to the contrary, method steps are interchangeable and specific sequences may be varied according to various alternatives contemplated. Accordingly, the claims are to be construed within such structure. Further, unless specifically taught to the contrary, method steps that include the phrase " . . . comprises at least one or more of A, B, and/or C . . . " means that the method step is to include every combination and permutation of the enumerated elements such as "only A", "only B", "only C", "A and B, but not C", "B and C, but not A", "A and C, but not B", and "A and B and C". This same claim structure is also intended to be open-ended and any such combination of the enumerated elements together with a non-enumerated element, e.g. "A and D, but not B and not C", is to fall within the scope of the claim. Given the open-ended intent of this claim language, the addition of a second element, including an additional of an enumerated element such as "2 of A", is to be included in the scope of such claim. This same intended claim structure is also applicable to apparatus and system claims.

Figure 1:
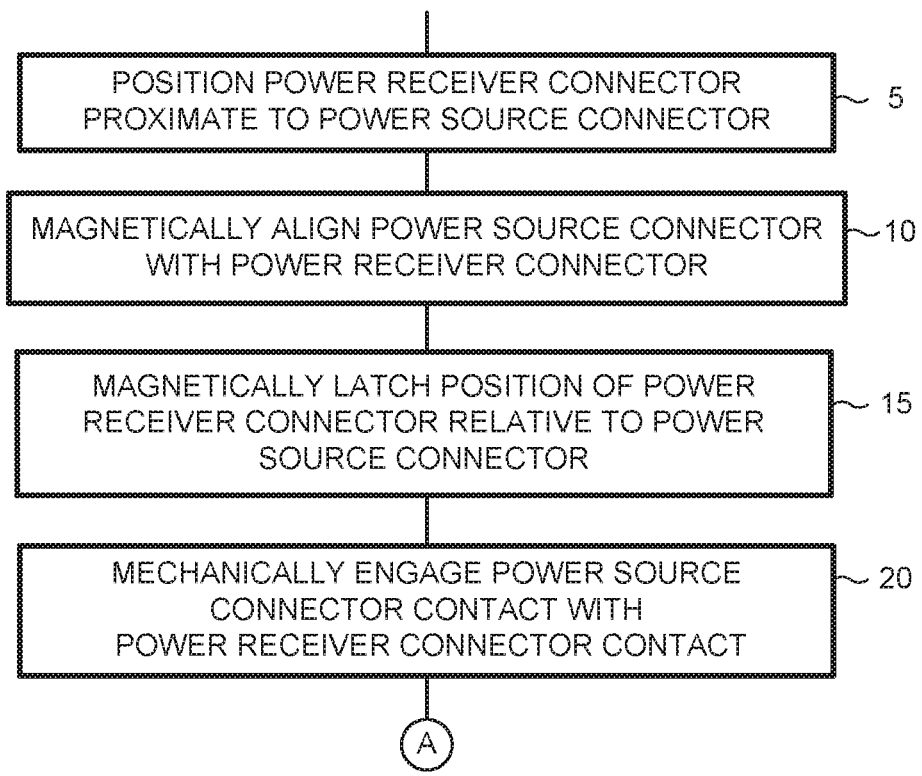
FIG. 1 is a flow diagram that depicts one example method for automatically connecting a power source connector to an electric vehicle.

FIG. 1 is a flow diagram that depicts one example method for automatically connecting a power source connector to an electric vehicle. According to this example method, automatically connecting a power source connector to an electric vehicle is accomplished by magnetically latching a charging port to the electric vehicle. As such, this example method comprises the steps of positioning a power receiver connector, which is installed on the electric vehicle, within the proximity of a power source connector (step 5).

As the distance between the power source connector and the power receiver connector begins to decrease, the power source connector is aligned with the power receiver connector by way of a magnetic force (step 10). The position of the power receiver connector relative to the power source connector is then maintained by way of the magnetic force (step 15). In essence, the power source connector and the power receiver connector are magnetically latched together in this state. Once the power source connector and the power receiver connector are magnetically latched together, contacts included in the power source connector is then engaged with the power receiver connector through the use of a mechanical force (step 20).

Figure 2:
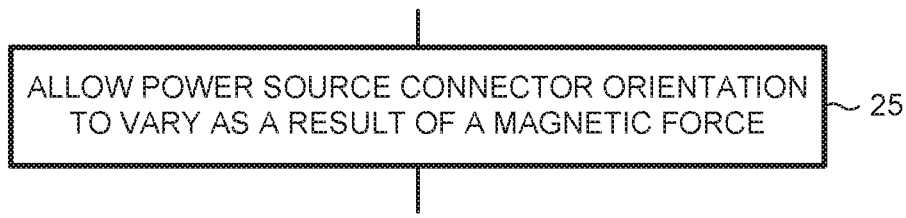
FIG. 2 is a flow diagram that depicts one alternative example method that facilitates alignment of the power source connector.

FIG. 2 is a flow diagram that depicts one alternative example method that facilitates alignment of the power source connector. It should be appreciated that, according to one illustrative use case, a power receiver connector is situated on an electric vehicle. In this illustrative use case, the power receiver connector is moved toward a power source connector by virtue of movement of the vehicle toward the power source connector. In this illustrative use case, the power source connector is supported in a facility, for example a garage. According to this alternative example method, as the distance between the power source connector and the power receiver connector is decreased, a magnetic force, which is associated with at least one or more of the power source connector and/or the power receiver connector, begins to act upon the power source connector.

According to this alternative example method, the power source connector is allowed to vary its orientation as it is acted upon by the magnetic force (step 25). According yet another illustrative use case, the power source connector includes a magnetic alignment feature. And, according to yet another illustrative use case, the power receiver connector includes a magnetic alignment feature. When a magnetic field, established by at least one or more of the magnetic alignment feature included in the power source connector and/or the magnetic alignment feature included in the power receiver connector, acts upon the power source connector, the power source connector is allowed to various orientation. According to one illustrative example embodiment of the present method, this is accomplished by a flexible member that supports the power source connector.

Figure 3:
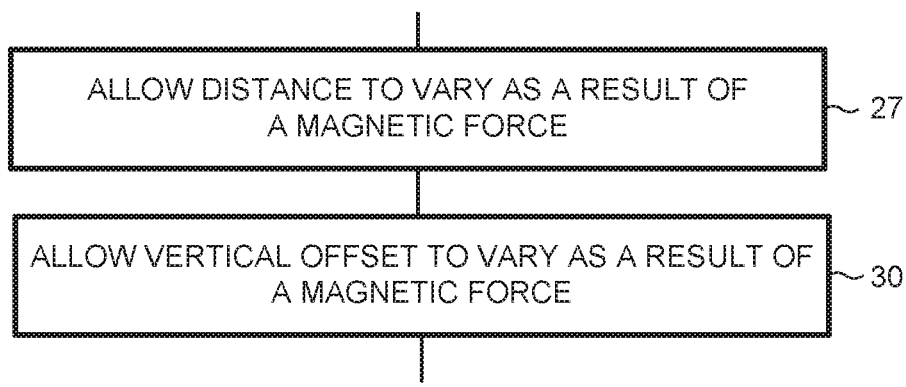
FIG. 3 is a flow diagram that depicts an alternative example method wherein the distance and a vertical offset between the power source connector and the power receiver connector is allowed to vary.

FIG. 3 is a flow diagram that depicts an alternative example method wherein the distance and a vertical offset between the power source connector and the power receiver connector is allowed to vary. It should likewise be appreciated that, according to various alternative example methods, as the magnetic force associated with at least one or more of the power source connector and/or the power receiver connector acts upon the power source connector, the distance between the power source connector and the power receiver connector is allowed to vary (step 27). According to one illustrative use case, as the car is moved toward the power source connector, magnetic force begins to pull the power source connector toward the power receiver connector.

This alternative example method also provides a step for allowing the vertical offset between the power source connector and the power receiver connector to vary when the power source connector is acted upon by a magnetic force (step 30). This can be appreciated in one illustrative use case where a slight vertical misalignment between the power source connector and the power receiver connector is accommodated by allowing the power source connector to move upward or downward when acted upon by the magnetic force.

Figure 4:
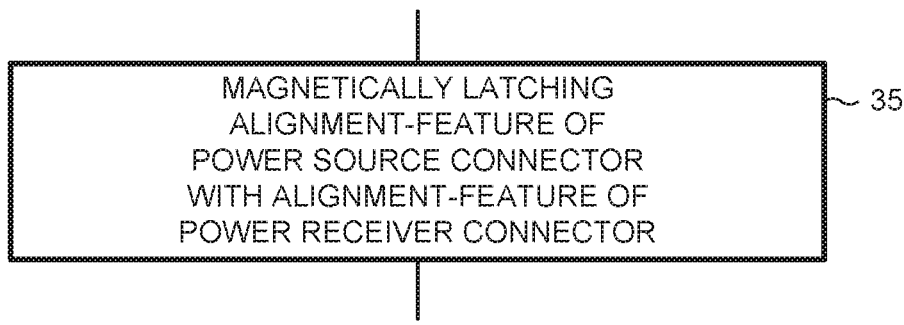
FIG. 4 is a flow diagram that illustrates one alternative example method wherein maintaining the position of the power receiver connector relative to the power source connector is accomplished by latching magnetic features associated with each connector.

FIG. 4 is a flow diagram that illustrates one alternative example method wherein maintaining the position of the power receiver connector relative to the power source connector is accomplished by latching magnetic features associated with each connector. According to this alternative example method, maintaining the position of the power receiver connector relative to the power source connector is accomplished by magnetically latching an alignment feature associated with the power source connector and an alignment feature associated with the power receiver connector (step 35). It should be appreciated that, according to various illustrative use cases, an alignment feature included in at least one or more of the power source connector and/or the power receiver connector comprises at least one or more of a convex feature and/or a concave feature. As the distance between the corresponding alignment features becomes smaller, the magnetic attraction between the two alignment features holds the two alignment features together, which is referred to herein as a latched state.

According to various illustrative use cases, when an alignment feature associated with a power source connector comprises a convex feature, the alignment feature associated with a power receiver connector comprises a concave feature. It should likewise be appreciated that, when an alignment feature associated with a power source connector comprises a concave feature, the alignment feature associated with a power receiver connector comprises a convex feature. Accordingly, engagement of the alignment features, according to various illustrative use cases of the present method, results in engagement between a concave feature and a corresponding convex feature.

Figure 5:
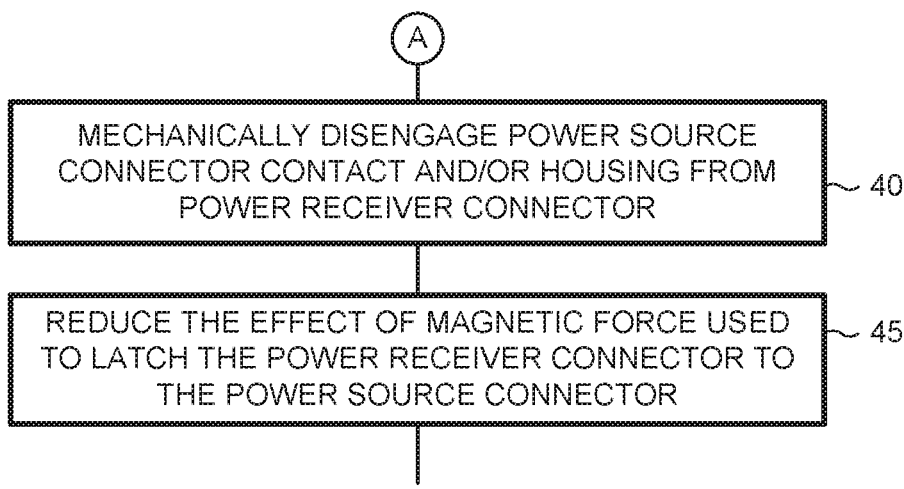
FIG. 5 is a flow diagram that depicts one alternative example method for disengaging the power source connector from the power receiver connector.

FIG. 5 is a flow diagram that depicts one alternative example method for disengaging the power source connector from the power receiver connector. It should be appreciated that, according to various illustrative use cases, it is important to maintain physical integrity of a charging port system. To that end, is important to disengage any electrical connection and/or any housing that includes electrical contacts that are included in the power source connector from the power receiver connector and then to also disengage the magnetic latch that is used to maintain the position of the power source connector relative to the power receiver connector. Accordingly, this alternative example method provides for mechanically disengaging the power source connector from the power receiver connector (step 40) and then reducing the effect of the magnetic force used to latch the power source connector to the power receiver connector (step 45). It should likewise be appreciated that, according to other illustrative use cases, the power source connector's contact housing and/or contacts are disengaged using mechanical force, for example as created by an actuator.

It should likewise be appreciated that, according to various illustrative embodiments of the present method, a magnetic alignment feature associated with at least one or more of the power source connector and/or the power receiver connector comprises a permanent magnet. And, in yet other alternative example embodiments of the present method, the magnetic alignment feature associated with at least one or more of the power source connector and/or the power receiver connector comprises an electrically-enabled magnet. It should likewise be appreciated that, according to various illustrative use cases, the reduction of magnetic force used to latch the power source connector to the power receiver connector is accomplished by deactivating an electrically-enabled magnet.

Figure 6:
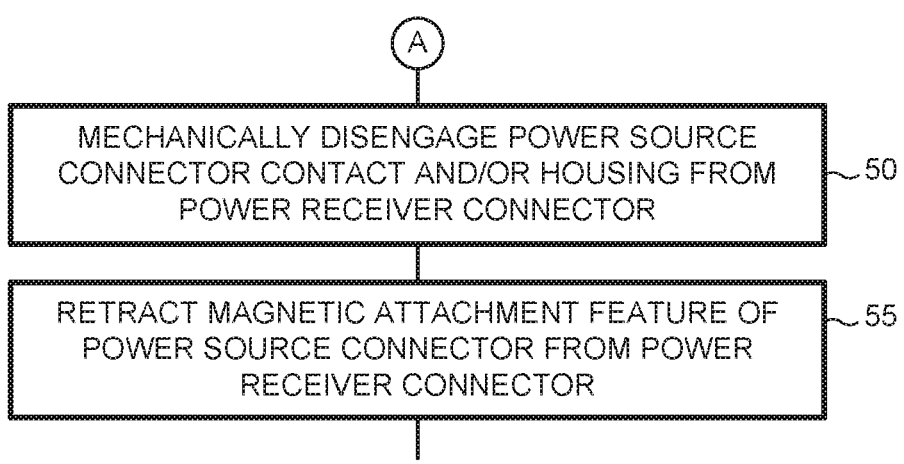
FIG. 6 is a flow diagram that depicts yet another alternative example method for disengaging any electrical contact and/or housing that holds such electrical contacts included in the power source connector from the power receiver connector.

FIG. 6 is a flow diagram that depicts yet another alternative example method for disengaging any electrical contact and/or housing that holds such electrical contacts included in the power source connector from the power receiver connector. In this alternative example method, once the power source connector's contact housing and/or contacts are disengaged from the power receiver connector (step 50), again using mechanical force, reducing the effect of the magnetic force is accomplished by drawing apart the magnetic alignment features associated with the power source connector and the power receiver connector. Accordingly, the magnetic attachment feature of the power source connector is retracted relative to the magnetic attachment feature associated with the power receiver connector (step 55).

Figure 7:
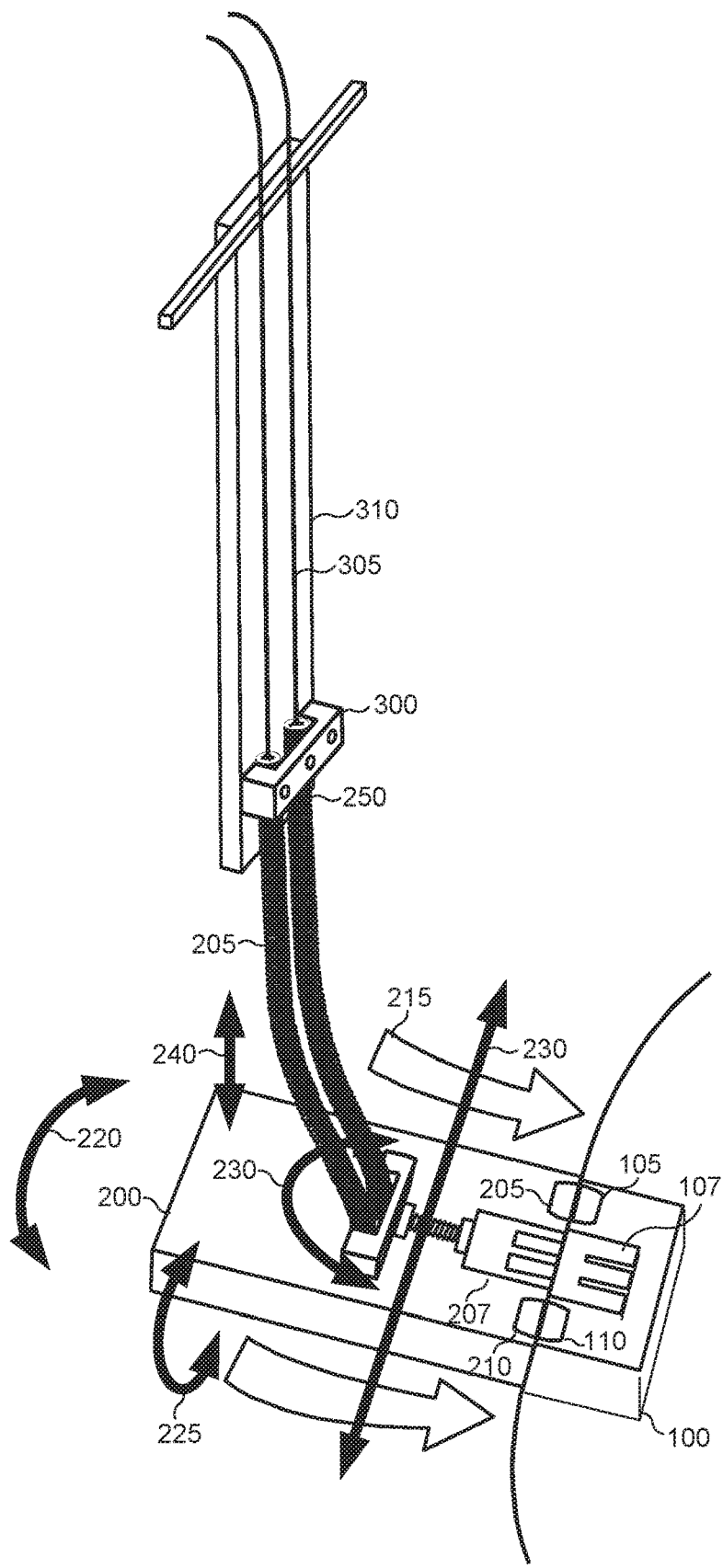
FIG. 7 is a pictorial diagram that illustrates one example embodiment of a charging port system for charging electric vehicles.

FIG. 7 is a pictorial diagram that illustrates one example embodiment of a charging port system for charging electric vehicles. According to this example embodiment, a system for charging electric vehicles comprises a power receiver connector 100 and a power source connector 200. It should be appreciated that, according to this example embodiment, the power receiver connector 100 is disposed on the electric vehicle. The power receiver connector 100, according to this example embodiment, includes a magnetic alignment device 105. A plurality of magnetic alignment devices (105, 100) is included in some alternative example embodiments of the system herein described. It should be appreciated that the magnetic alignment device 105 is situated in order to align a power source connector 200 with the power receiver connector 100.

The power receiver connector 100 of this example embodiment also includes a contact structure 107 for receiving electrical power from a power source connector 200 by way of a temporary conductive path. It should be appreciated that the temporary conductive path is established when the contacts included in the contact structure 107 included in the power receiver connector 100 are engaged with contacts included in the contact structure 207 included in the power source connector 200.

The power source connector 200 of this example embodiment also includes a magnetic alignment device 205. There are embodiments where a plurality of magnetic alignment devices (205, 210) is included in the power source connector 200. The power source connector 200 also includes a contact structure 207 that provides electrical power to the power receiver connector 100 by way of a temporary conductive path, as heretofore described.

According to one alternative example embodiment, the charging port system you are described further includes a flexible member 205, which is used to suspend the power source connector 200 in three-dimensional space. The flexible member 205 is selected empirically selected so that the flexibility of the flexible member 205 is great enough to allow orientation of the power source connector 200 to vary in three-dimensional space. As described in the figure, orientation of the power source connector 200 is allowed to vary in three axes. Much akin to traditional descriptions for an airframe, the flexible member 205 allows the power source connector 200 to rotate 230 about a yaw axis. The flexible member 205 also allows the power source connector 200 to tilt 220 about a pitch access. The flexible member 205 also allows the power source connector 200 to roll 225 about a roll axis.

The flexible member 205 also allows the power source connector 200 to vary position horizontally 230 and vertically 240. As such, all of this unconstrained movement allows the power source connector 200 to be drawn in 215 to the power receiver connector 100 by way of the magnetic alignment features (105 and 205).

It should likewise be appreciated that the flexible member 205 includes a mounting end 250, which is mechanically mounted to a fixed facility. This, according to one illustrative use case, is accomplished by using a suspension boom 310 and a bracket 300, which is used to secure the mounting end 250 of the flexible member 205 to the suspension boom 310. The suspension boom 310 is mounted to a fixed surface, or other feature within a fixed facility, for example the ceiling in a garage.

FIG. 8A through 8E are pictorial diagrams that illustrate various example embodiments of a magnetic alignment feature. According to one alternative example embodiment, a magnetic alignment feature 150 (FIG. 8A) comprises a convex portion 160. According to yet another alternative example embodiment, a magnetic alignment feature 170 (FIG. 8B) comprises a concave portion 180. It should be appreciated, by study of FIG. 8C, that any misalignment of one magnetic alignment feature 150 relative to a corresponding magnetic alignment feature 170 is managed by driving the convex portion 160 of the first magnetic alignment feature 150 into the void created by a concave portion 180 of the corresponding magnetic alignment feature 170. FIGS. 8D and 8E show a convex magnetic alignment feature 150 fully engaged with a concave magnetic alignment feature 170.

It should be appreciated that, according to various alternative example embodiments, where a power source connector comprises a convex magnetic alignment feature 150, the power receiver connector will include a concave magnetic alignment feature 170. The converse is true for other alternative example embodiments. It should likewise be appreciated that, according to various alternative example embodiments, the magnetic alignment feature in the power source connector comprises at least one or more of a non-electrically-enabled-magnet and/or an electrically-enabled-magnet. It should likewise be appreciated that, according to various alternative example embodiments, the magnetic alignment feature in the power receiver connector comprises at least one or more of a non-electrically-enabled-magnet and/or an electrically-enabled-magnet.

Figure 9:
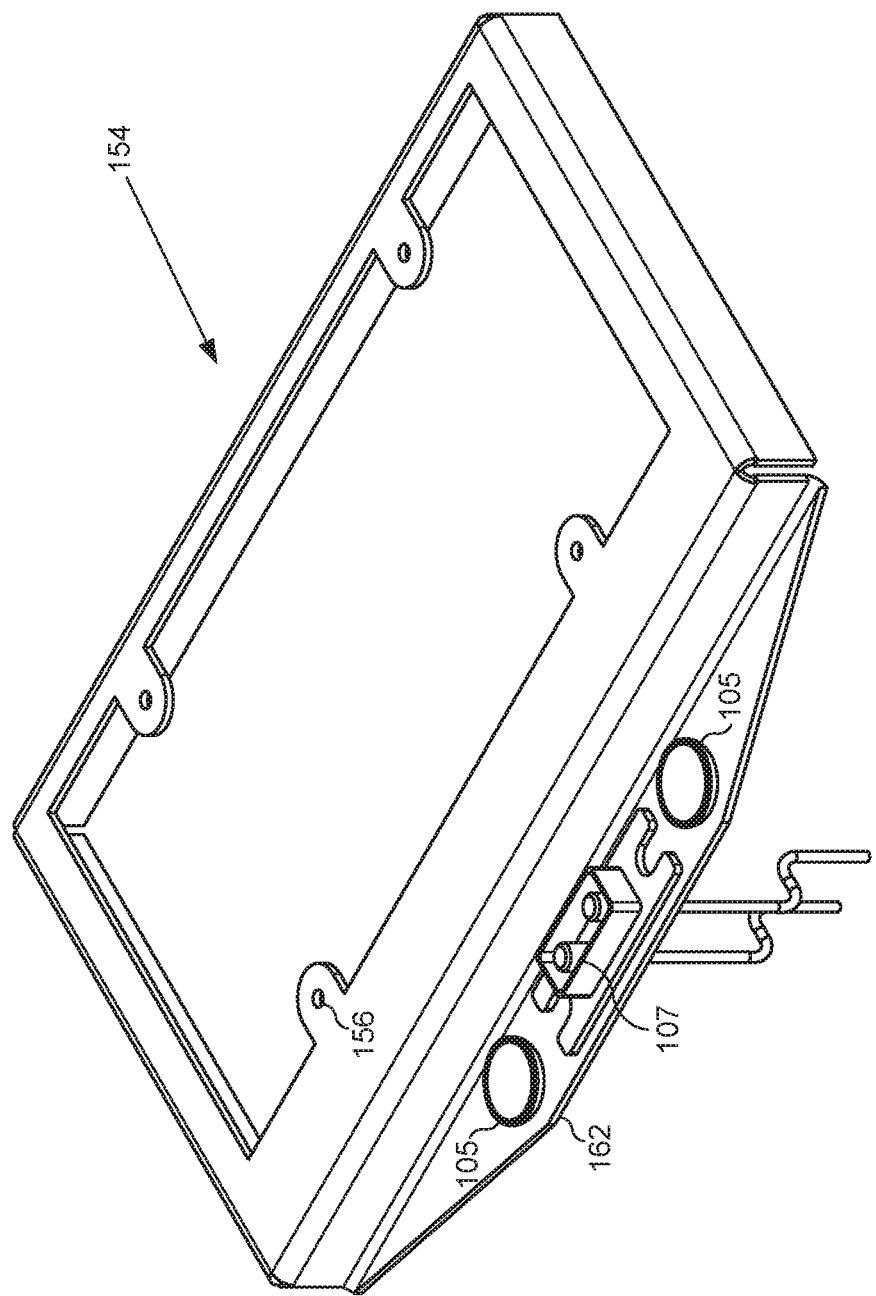
FIG. 9 is a pictorial diagram that illustrates one alternative example embodiment where the power receiver connector is integrated with a license plate frame.

FIG. 9 is a pictorial diagram that illustrates one alternative example embodiment where the power receiver connector is integrated with a license plate frame. It should be appreciated that, according to one alternative example embodiment, the elements of a power receiver connector 100 are integrated onto a license plate frame 154. In this alternative embodiment, the license plate frame 154 includes typical features, such as mounting holes 156 that are used to mount the license plate frame 154 to a vehicle. This alternative example embodiment also includes a flange 162 that is integral to the license plate frame 154. Mounted on this flange 162 are one or more magnetic alignment features (105, 110) and the contact structure 107. Accordingly this alternative example embodiment of a system includes a power receiver connector that further includes a license plate frame 154 that includes a flange 162 for mounting a magnetic alignment feature 105 and the contact structure 107.

Figure 10:
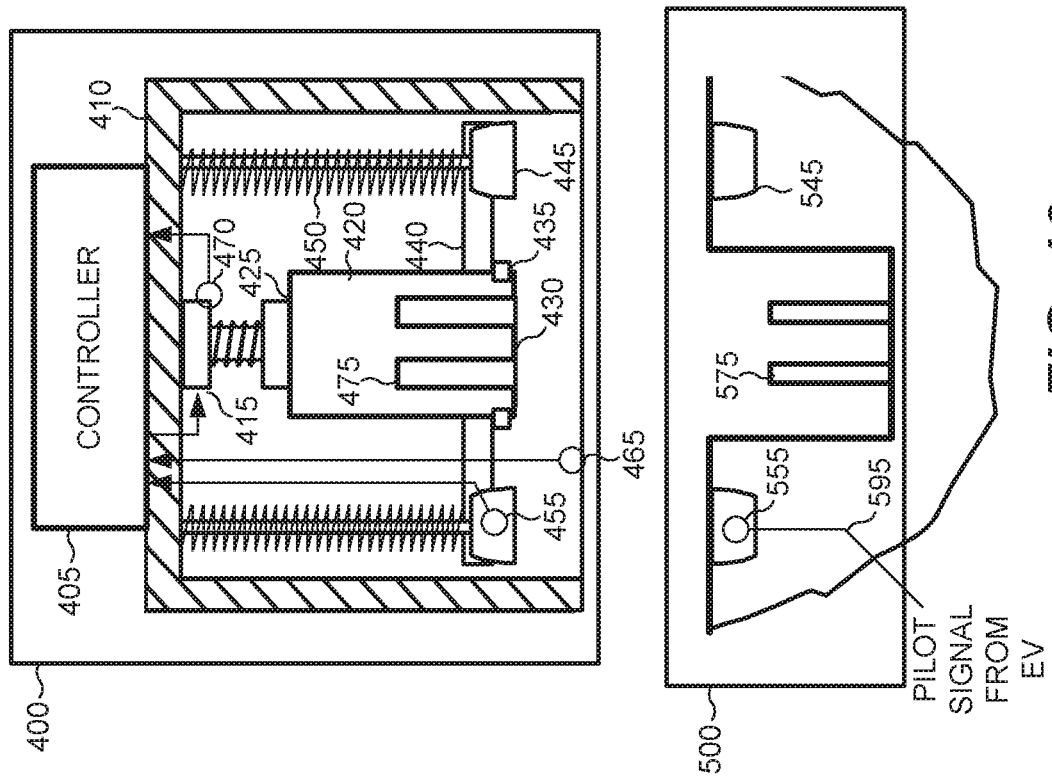
FIG. 10 is a pictorial diagram that illustrates one alternative example embodiment of a power source connector that is based on a single actuator.

FIG. 10 is a pictorial diagram that illustrates one alternative example embodiment of a power source connector that is based on a single actuator. According to this alternative example embodiment, the power source connector 400 comprises a connector base member 410. The connector base member 410 serves as a supporting structure for an actuator 415, which is included in this alternative example embodiment. The actuator 415 includes a fixed end that is attached to the connector base member 410 and a travel end.

This alternative example embodiment of a power source connector 400 also includes an electrical contact housing 420 that includes a contact end 430 and an attachment end 425. The attachment end 425 of the electrical contact housing 420 is mechanically coupled to the travel-end of the actuator 415. A magnet support member 440 is also included in this alternative example embodiment of a power source connector 400.

The magnet support member 440 is movably coupled to the electrical contact housing 420. It should be appreciated that the magnet support member 440, according to one alternative example embodiment, is substantially planar and fits about the perimeter of the electrical contact housing 420. As such, the magnet support member 440 is free to move along a coaxial axis of the electrical contact housing 420. Since the magnet support member 440 is free to move between the contact and 430 and the attachment end 425 of the electrical contact housing 420, a limit-stop 435 is included about the perimeter of the contact-end 430 of the electrical contact housing 420. The limit-stop 435 prevents the magnet support member 440 from traveling beyond the contact and 430 of the electrical contact housing 420.

It should be appreciated that the electrical contact housing 420 also includes one or more contacts 475, which are used to create a temporary conductive path from the power source connector 400 to power receiver connector 500, which is mounted on an electric vehicle. The power receiver connector 500, in this alternative example embodiment, includes one or more contacts 575 which engage with electrical contacts 475 included in the electrical contact housing 420, which is part of the power source connector 400.

According to one alternative example embodiment, a pilot signal 595 is routed from the power receiver connector 500 to the power source connector 400. According to one alternative example embodiment, connection of the pilot signal 595 from the power receiver connector 500 to the power source connector 400 is accomplished by means of an electrical connection (455, 555) between a magnetic alignment feature 455 included in the power source connector 400 and a magnetic alignment feature 545 included in the power receiver connector 500. It should be appreciated that the pilot signal 595 is sourced from the electric vehicle in order to indicate the amount of charge required. As such, a charging circuit is then commanded to provide electric power to the electric vehicle according to the pilot signal 595.

According to one alternative example embodiment, the power source connector 400 further includes a controller 405. This alternative embodiment also includes a proximity sensor 465 and a "fully-extracted" sensor 470. The proximity sensor 465 is disposed in order to sense proximity between the power source connector 400 and the power receiver connector 500. The output of both of these sensors is routed back to the controller 405.

Figure 11:
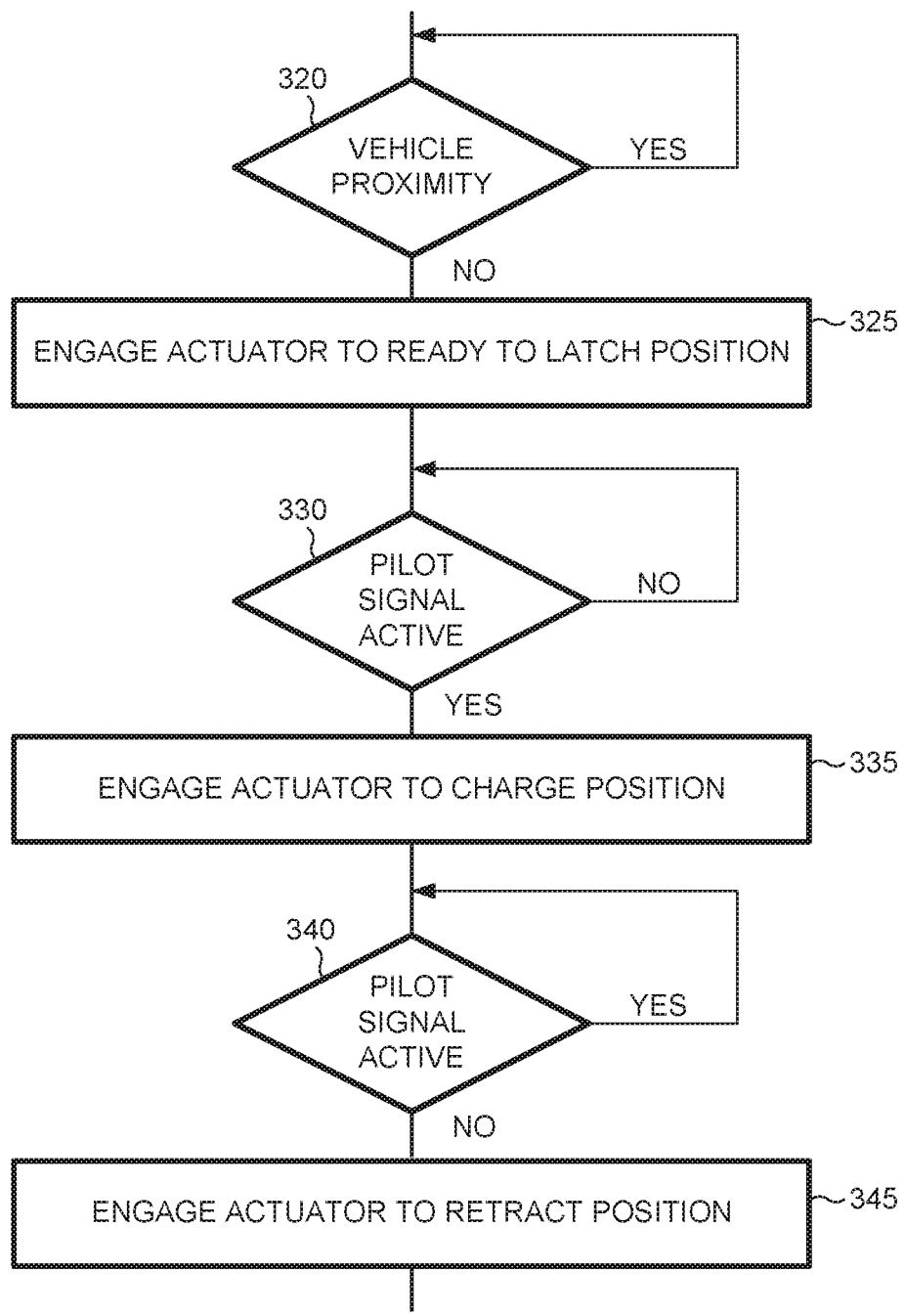
FIG. 11 is a flow diagram that depicts the operation of one alternative example embodiment of a controller used to control a single actuator power source connector.

FIG. 11 is a flow diagram that depicts the operation of one alternative example embodiment of a controller used to control a single actuator power source connector. Upon startup, the controller 405 monitors the state of the "fully retracted" sensor 470 in order to retract the electrical contact housing 420 an initial state. The controller 405 then monitors (step 320) the state of the proximity sensor 465. When the proximity sensor indicates that there is significant clearance between the power source connector 400 and the power receiver connector 500, then the controller 405 engages the actuator 415 in order to move the electrical contact housing 420 toward engagement with a power receiver connector 500. In one alternative example embodiment, the power source connector 400 also includes an elastic member 450 which is disposed to position, when it is in a relatively relaxed state, the magnet support member 440 toward the contact and 430 of the electrical contact housing 420.

Figure 12B:
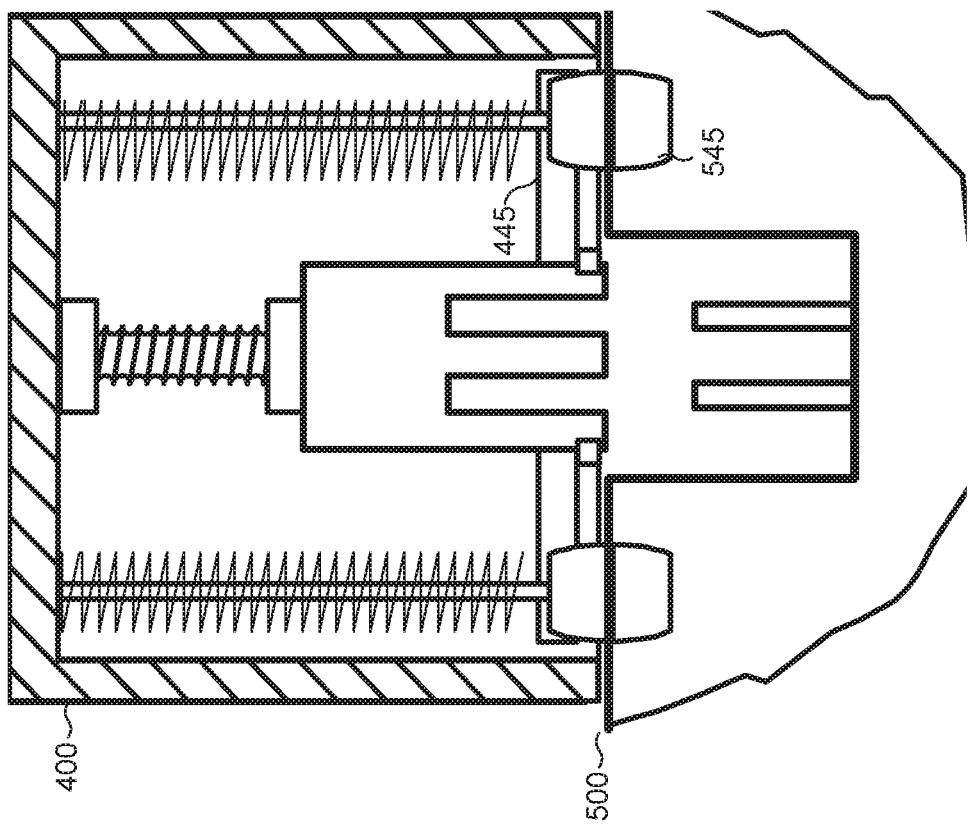
FIGS. 12A and 12B are pictorial diagrams that illustrate a "ready to latch" state and a "latched" state of a power source connector that uses a single actuator.
Figure 12A:
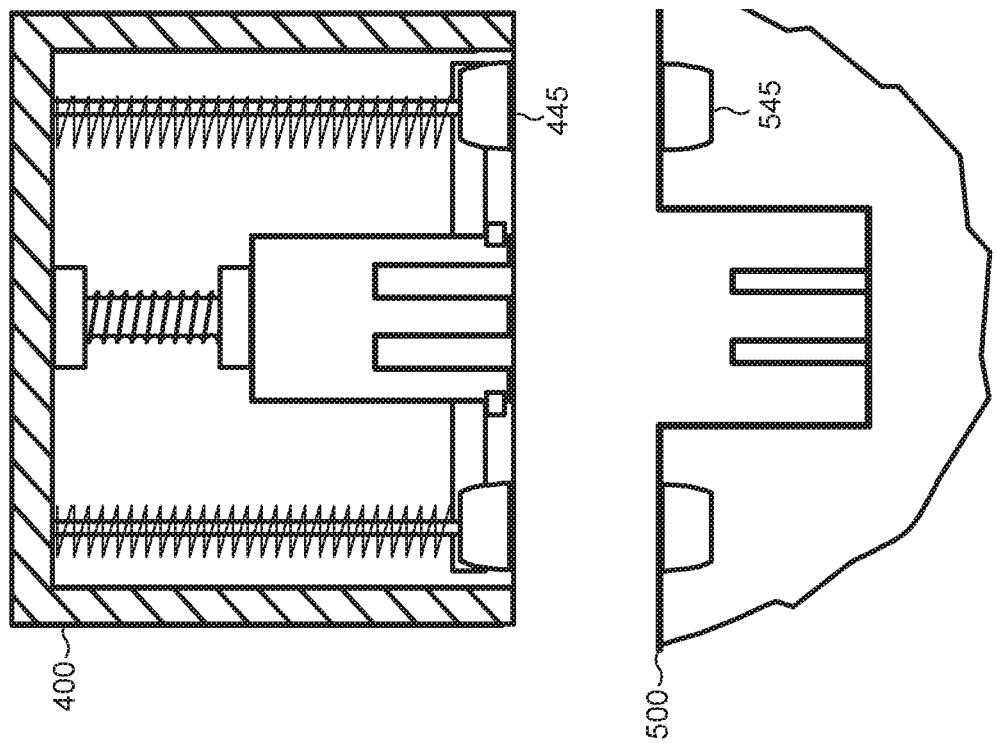

FIGS. 12A and 12B are pictorial diagrams that illustrate a "ready to latch" state and a "latched" state of a power source connector that uses a single actuator. In FIG. 12A, the controller 405 relies upon a priori knowledge as to how many actuator pulses are necessary to move the electrical contact housing 420 from its initial position to a "ready to latch" state. In this state, the magnetic alignment feature 445 included in the power source connector 400 are brought to a point where they can be used for alignment. Again, it is important to note that it is the elastic member that continues to apply a force to move the magnet support member toward disposition. As shown in FIG. 12B, as the distance between the power source connector 400 and the power receiver connector 500 continues to close, the magnetic alignment features (445, 545) eventually magnetically latch to each other. This is known as the "latched" state.

FIG. 11 further illustrates that the controller 405 begins to monitor the pilot signal 595. When the pilot signal becomes active (step 330), the controller 405 infers that the power source connector 400 and the power receiver connector 500 are latched together magnetically. At this point, the controller 405 again engages the actuator to move the electrical contact housing 420 to the "charge position" (step 335). Again, the controller 405 applies the necessary number of pulses to the actuator to achieve this precision movement.

FIG. 13 is a pictorial diagram that illustrates a "charge position" state of a power source connector that uses a single actuator. As can be appreciated, the electrical contact housing 420 is moved beyond the magnetic alignment features and essentially pushes through the magnet support member. As such, the magnet support member actually does not move relative to the power receiver connector 500. While in this "charge position" state, the magnet support member 440 is situated toward the attachment-end 425 of the electrical contact housing 420. Also, a contact 475 included in the electrical contact housing 420 becomes engaged with a contact 575 included in the power receiver connector 500.

Figure 14:
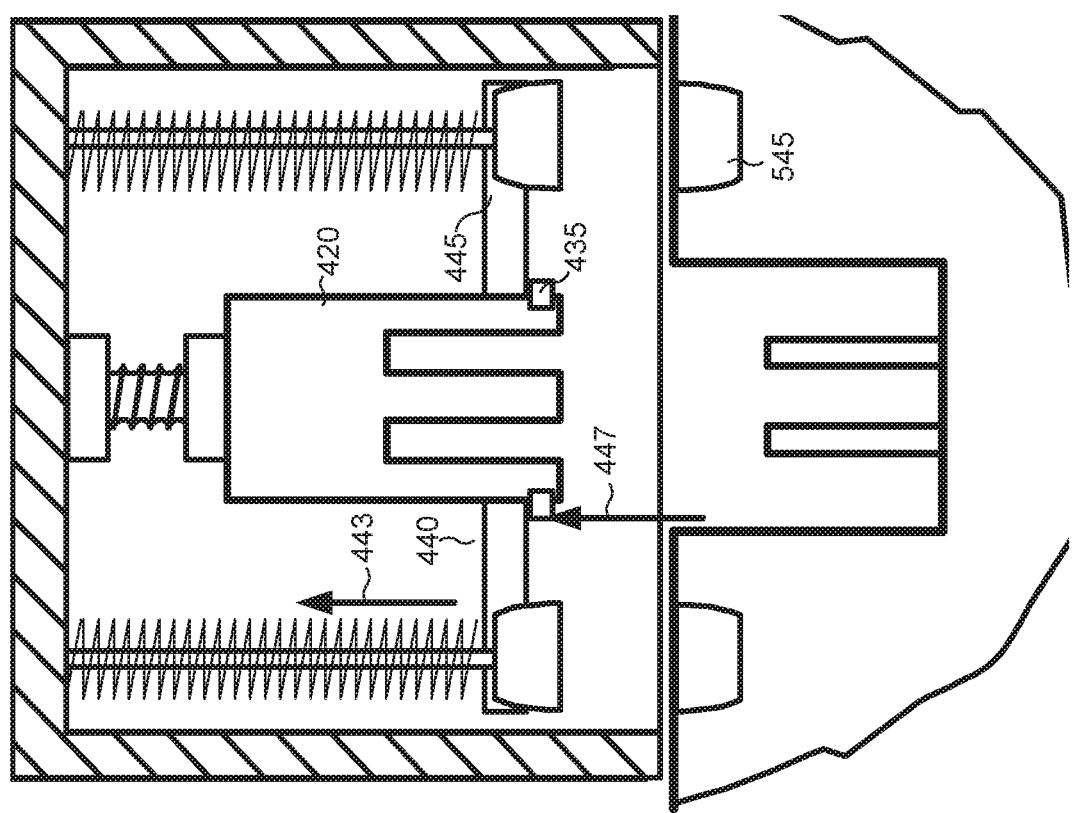
FIG. 14 is a pictorial diagram that illustrates a fully retracted state of a power source connector that uses a single actuator.

FIG. 14 is a pictorial diagram that illustrates a fully retracted state of a power source connector that uses a single actuator. It is helpful to understand that, as shown in FIG. 11, the controller 405 engages the actuator 345 to retract the electrical contact housing 420 when the pilot signal 595 is no longer active (step 340). As the electrical contact housing 420 is retracted, the limit stop 435 applies a force 447 to the magnet support member 440. In turn, this causes the magnet support member 440 to be pulled back 443. One aspect of this extraction process is that the contacts included in the electrical contact housing 420 disengage from the contacts included in the power receiver connector 500. Then, once the electrical contact housing 420 is clear of the contacts included in the power receiver connector 500, the upward force 447 apply to the magnet support member 440 pulls the magnetic alignment feature 445 included in the power source connector 400 away from the magnetic alignment feature 545 included in the power receiver connector 500.

FIG. 15 is a pictorial diagram that illustrates one alternative example embodiment of a power source connector that utilizes two or more actuators. According to this alternative example embodiment, a power source connector 700 comprises a connector base member 710, a first actuator 715, a second actuator 717, an electrical contact housing 720 and a magnetic alignment feature 745. It should be appreciated that, in this alternative example embodiment, the first actuator includes a fixed-end that is attached to the connector base member 710 and a travel-end.

It should likewise be appreciated that, according to this alternative example embodiment, the first actuator 715 is used to control movement of the electrical contact housing 720. The electrical contact housing 720 includes an attachment and 725, which is mechanically coupled to the travel-end of the first actuator 715. In operation, the first actuator 715 moves the electrical contact housing 720 toward and away from a power receiving connector 500. Again, the power receiving connector 500 is situated on an electric vehicle.

As may be ascertained from the drawings, the second actuator 717 is used to control the position of the magnetic alignment feature 745. The second actuator 717 moves the magnetic alignment feature 745 included in this alternative example embodiment of a power source connector 700 toward and away from a power receiving connector 500. In those embodiments that rely upon a third actuator 719, such third actuator controls the movement of a second magnetic alignment feature 747 included in the power source controller 700.

According to one alternative example embodiment, the power source connector 700 further includes a controller 705. And, in this alternative example embodiment, a proximity sensor 765 is also included in the power source connector 700. Akin to operation and function of the proximity sensor 465 included in an earlier described embodiment of a power source connector 400, the proximity sensor 765 here detects when the power source connector 700 is proximate to a power receiver connector 500.

Also included in this alternative example embodiment is a signal path to convey a pilot signal 595 from the electric vehicle to the controller 705. In a manner analogous to an earlier described embodiment, the pilot signal 595 is connected (555, 755) by way of magnetic alignment features included in the power source connector 700 and the power receiver connector 500.

Figure 16:
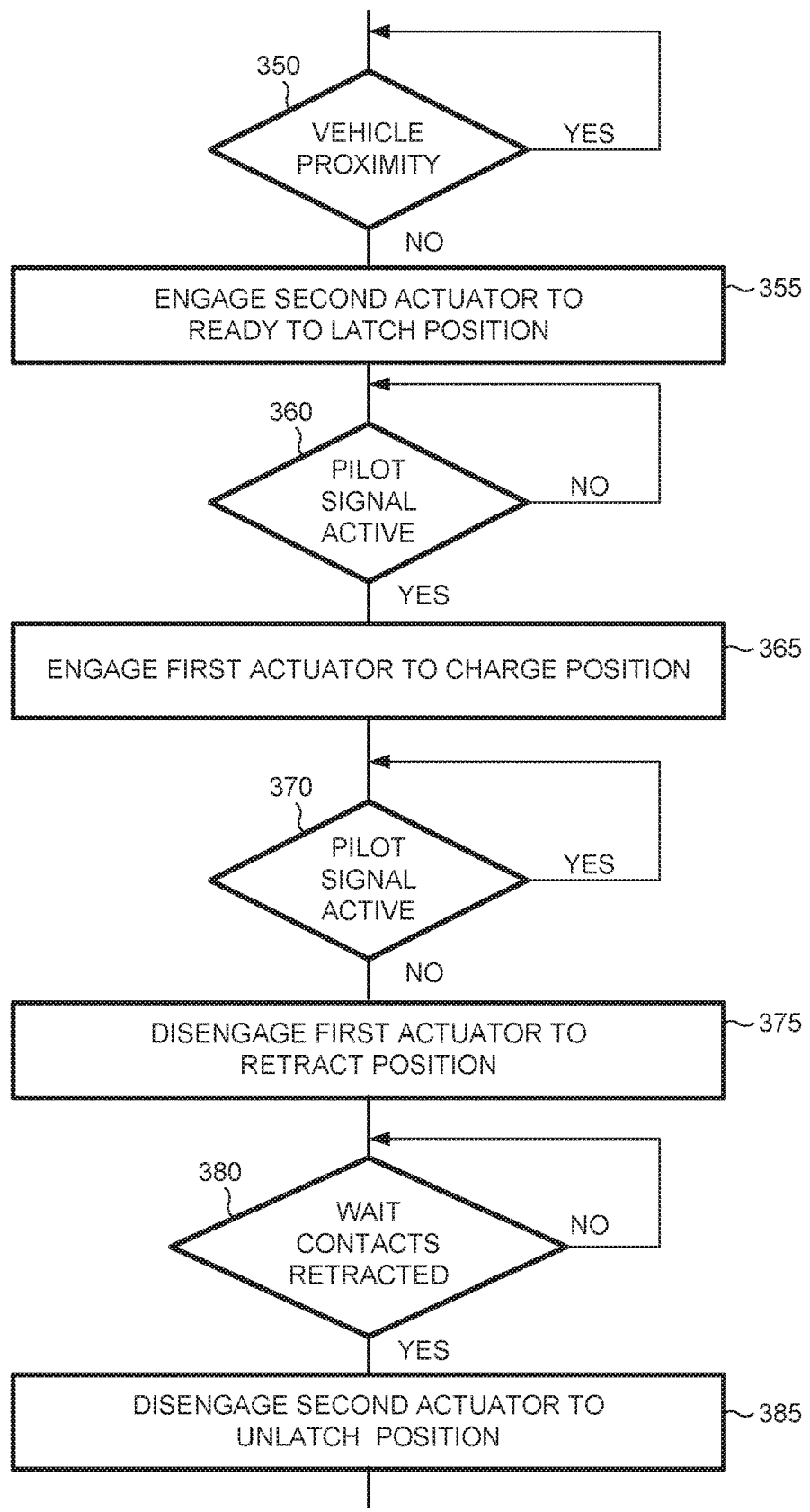
FIG. 16 is a flow diagram that depicts the operation of a controller used to control power source connectors that rely upon two or more actuators.

FIG. 16 is a flow diagram that depicts the operation of a controller used to control power source connectors that rely upon two or more actuators. It should likewise be appreciated that, according to this alternative example embodiment, the actuators used in the power source connector 700 included two operating positions, one position being an engaged position and a second position being a disengaged position. In this alternative example embodiment of a controller 705, the controller 705 does not need to retract either of the first or second actuators because there is no need to calibrate the positioning of these two operating position actuators.

Figure 17:
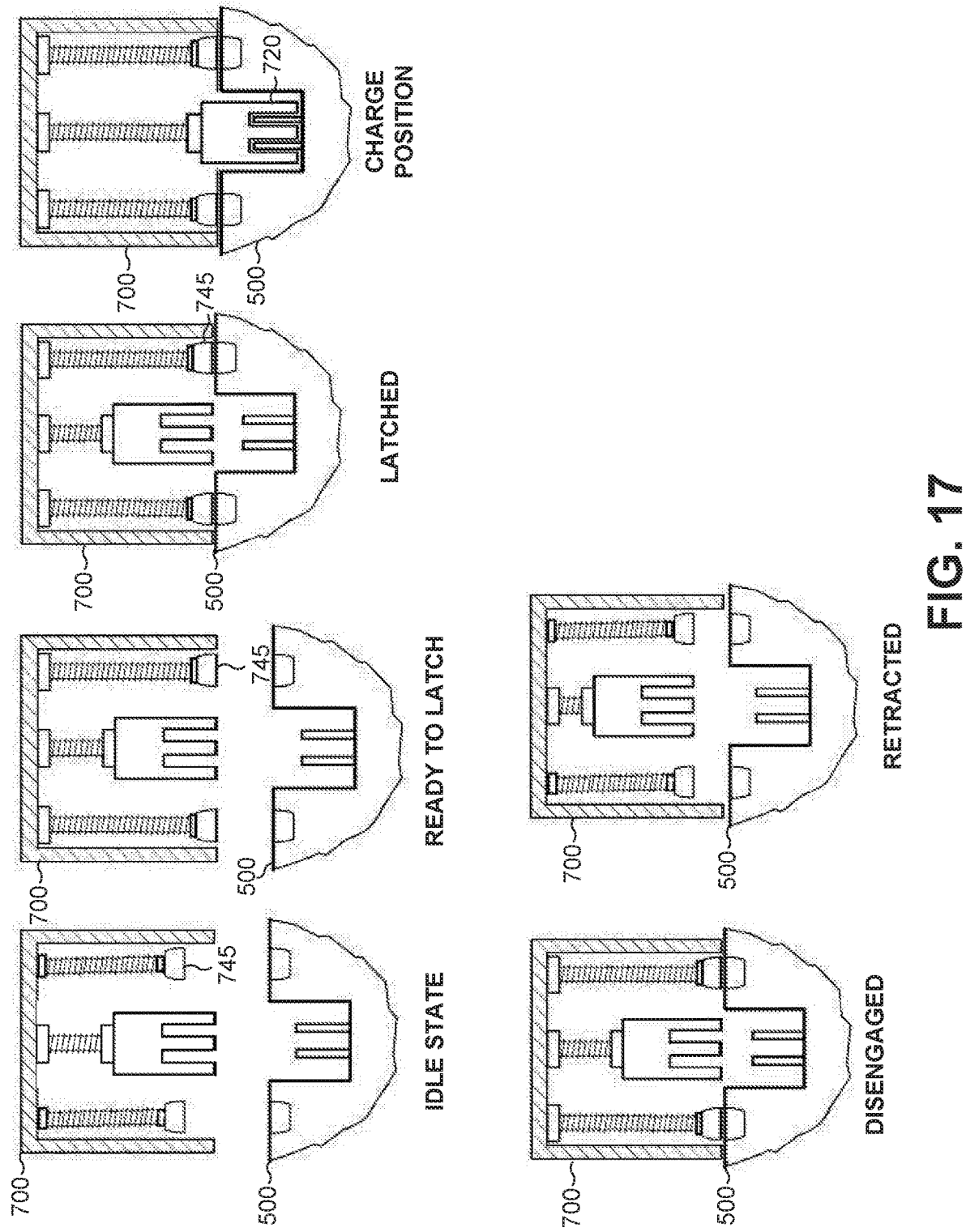
FIG. 17 is a pictorial diagram that presents a sequence of operating states associated with a power source controller that relies upon two or more actuators.

FIG. 17 is a pictorial diagram that presents a sequence of operating states associated with a power source controller that relies upon two or more actuators. Initially, the power source connector 700 assumes an "idle state". In this idle state, neither the first nor the second actuator is engaged. In this position, the controller 705 senses that a power receiver connector 500 is not within proximity range.

Accordingly, when the proximity sensor 765 indicates that a vehicle is not within a proximity range (step 350), the controller 705 engages the second actuator 717. This causes the second actuators 717 to move its associated magnetic alignment feature 745 into a "ready to latch" position (step 355). As the distance between the power source connector 700 and the power receiver connector 500 continues to close, eventually the magnetic alignment features, included in the power source connector 700 and the power receiver connector 500, latch the two connectors together, resulting in a "latched" state.

It should likewise be appreciated that, once in the latched state, the pilot signal 595 is available to the controller. Once a controller 705 detects an active pilot signal (step 370), it engages the first actuator 715 in order to position the electrical contact housing 720 into a "charge position". At this point, electrical connection is made between the power source connector 700 and the power receiver connector 500 and the electrical vehicle may be charged.

FIG. 16 further illustrates that once the pilot signal becomes inactive (step 370), the controller 705 disengages the first actuator (step 375) in order to retract the electrical contact housing 720. This disengages from each other the contacts (775, 575) included in the electrical contact housing 720 and the power receiver connector 500. This results in a disengaged state. It should be noted that, although the electrical contacts have been disengaged, the power source connector 700 and the power receiver connector 500 remain in a latched configuration, which is also known as a disengaged state.

Once the contacts have been disengaged and the electrical contact housing 720 has been retracted from the power receiver connector 500, the magnetic alignment features included in the power source connector 700 and the power receiver connector 500 may be pulled apart, thus terminating the latched position. The controller 705, after having disengaged the first actuator (step 375), then waits a particular amount of time (step 380) and then disengages the second actuator 717, which retracts the magnetic alignment features included in the power source connector 700. Again this safely detaches the power source connector 700 from the power receiver connector 500.

While the present method and apparatus has been described in terms of several alternative and exemplary embodiments, it is contemplated that alternatives, modifications, permutations, and equivalents thereof will become apparent to those skilled in the art upon a reading of the specification and study of the drawings. It is therefore intended that the true spirit and scope of the claims appended hereto include all such alternatives, modifications, permutations, and equivalents.

What is claimed is:

1. A method for magnetically latching a charging port to an electric vehicle comprising the steps of:
    positioning a power receiver connector installed on the electric vehicle proximate to a power source connector;
    aligning the power source connector with the power receiver connector by way of a magnetic force comprises,
    allowing the distance between the power source connector relative to the power receiver connector to vary when the power source connector is acted upon by a magnetic force, and
    allowing the vertical offset between the power source connector relative and the power receiver connector to vary when the power source connector is acted upon by a magnetic force;
    maintaining the position of the power receiver connector relative to the power source connector using the by way of the magnetic force; and
    engaging a power source contact included in the power source connector with a power receiver contact included in the power receiver connector by way of a mechanical force.

2. The method of claim 1 wherein aligning the power source connector with the power receiver connector comprises:
    allowing the orientation of the power source connector relative to the power receiver connector to vary in 3-D space when the power source connector is acted upon by a magnetic force.

3. The method of claim 1 wherein maintaining the position of the power receiver connector relative to the power source connector comprises:
    latching, by way of the magnetic force, an alignment-feature associated with the power source connector with an alignment-feature associated with the power receiver connector.

4. The method of claim 1 further comprising the steps of:
    disengaging the power source contact included in the power source connector from the power receiver contact included in the power receiver connector by way of the mechanical force; and
    reducing the effect of the magnetic force used to latch the position of the power receiver connector relative to the power source connector.

5. The method of claim 1 further comprising the steps of:
    disengaging the power source contact included in the power source connector from the power receiver contact included in the power receiver connector by way of the mechanical force; and
    retracting a magnetic attachment feature associated with the power source connector relative to the power receiver connector.

6. A charging port system for charging electric vehicles comprising:
    power receiver connector disposed on an electric vehicle that includes:
    magnetic alignment device disposed to align a power source connector with the power receiver connector;
    contact structure for receiving electrical power from a power source connector through a temporary conductive path;
    power source connector disposed on a flexible member that includes:
    connector base member,
    actuator that includes a fixed end that is attached to the connector base member and a travel-end,
    electrical contact housing that includes a contact end and an attachment end and wherein the attachment end is mechanically coupled to the travel-end of the actuator,
    magnet support member that is moveably coupled to the electrical contact housing and is disposed to travel substantially between the contact-end and the attachment,
    alignment magnet attached to the magnet support member and disposed to engage with a magnet included in a power receiver connector, and
    elastic member disposed to position the power source connector toward the contact end of the electrical contact housing when it is in a relatively relaxed state;
    magnetic alignment device disposed to align the power source connector with the power receiver connector; and
    contact structure for providing electrical power to the power receiver connector by way of a temporary conductive path.

7. The charging port system of claim 6 wherein the power source connector is mounted on a flexible member that allows the orientation of the power source connector to vary in 3-dimensional space.

8. The charging port system of claim 6 wherein the power source connector is mounted on a flexible member that allows the orientation of the power source connector to vary in 3-dimensional space and wherein the flexible member includes a mounting end for fixing the flexible member to a fixed-facility.

9. The charging port system of claim 6, wherein the magnetic alignment device included in the power source connector comprises a convex feature that corresponds to a concave feature included on the magnetic alignment device included in the power receiver connector.

10. The charging port system of claim 6 wherein the magnetic alignment device included in the power source connector comprises a concave feature that corresponds to a convex feature included on the magnetic alignment device included in the power receiver connector.

11. The charging port system of claim 6 wherein the magnetic alignment device included in the power source connector comprises at least one or more of a non-electrically-enabled-magnet and/or an electrically-enabled-magnet.

12. The charging port system of claim 6 wherein the magnetic alignment device included in the power receiver connector comprises at least one or more of a non-electrically-enabled-magnet and/or an electrically-enabled-magnet.

13. The charging port system of claim 6 wherein the power receiver connector is integrated with a license plate frame.

14. The charging port system of claim 6 power source connector further includes a controller that:

drives the actuator to position the magnet support member to a ready-to-latch position when a proximity sensor indicates that the power source connector is not within a proximity range to a power receiver connector;

drives the actuator to position the electrical contact housing to a charge position when a proximity sensor indicates the power source connector is within proximity range of the power receiver connector; and drives the actuator to fully retract the electrical contact housing and magnet support member when a charging pilot signal indicates charging is complete.

15. The charging port system of claim 6 wherein the actuator comprises at least one or more of rotating actuator and/or linear actuator.

16. The charging port system of claim 6 wherein the actuator comprises at least one or more of a stepper motor and/or servo motor.

17. The charging port system of claim 6 wherein the actuator, when engaged, causes the electrical contact housing to move through a plane associated with the magnet support member when the magnets are engaged with corresponding magnets on an electrical receiver connector.

18. The charging port system of claim 6, wherein the electrical contact housing further includes a mechanical stop disposed to prevent the magnet support member from traveling beyond the contact end.

19. A charging port system for charging electric vehicles comprising:

power receiver connector disposed on an electric vehicle that includes:

magnetic alignment device disposed to align a power source connector with the power receiver connector;

contact structure for receiving electrical power from a power source connector through a temporary conductive path;

power source connector disposed on a flexible member that includes:

connector base member;

first actuator that includes a fixed end that is attached to the connector base member and a travel-end;

electrical contact housing that includes a contact end and an attachment end and wherein the attachment end is mechanically coupled to the travel-end of the first actuator;

second actuator that includes a fixed-end that is attached to the connector base member and a travel-end;

magnet support member that is attached to the travel-end of the second actuator;

alignment magnet attached to the magnet support member and disposed to engage with a magnet included in a power receiver connector, and elastic member disposed to position the power source connector toward the contact end of the power receiver connector when it is in a relatively relaxed state;

magnetic alignment device disposed to align the power source connector with the power receiver connector; and contact structure for providing electrical power to the power receiver connector by way of a temporary conductive path.

20. The charging port system of claim 19 power source connector further includes a controller that:

drives the second actuator to position a magnetic alignment feature to a ready-to-latch position when a proximity sensor indicates that the power source connector is not within a proximity range to a power receiver connector;

drives the first actuator to position the electrical contact housing to a charge position when a proximity sensor indicates power source connector is within proximity range to a power receiver connector;

drives the first actuator to retract the electrical contact housing when the pilot signal become inactive; and drives the second actuator to position the magnetic alignment feature to a retraced and delatched position after the electrical contact housing has been retracted.

\* \* \* \* \*